United States Patent [19] [11] 3,798,760
Carlson et al. [45] Mar. 26, 1974

[54] METHOD OF MAKING RESISTANCE WIRE TEMPERATURE SENSOR

[75] Inventors: John T. M. Carlson, Edina; Gerald P. Lawson, Blaine, both of Minn.

[73] Assignee: Rosemount Inc., Eden Prairie, Minn.

[22] Filed: May 11, 1973

[21] Appl. No.: 359,328

Related U.S. Application Data

[62] Division of Ser. No. 186,001, Oct. 4, 1971, Pat. No. 3,761,857.

[52] U.S. Cl............................. 29/612, 29/614, 29/618, 29/619
[51] Int. Cl.............................................. H01c 7/04
[58] Field of Search ............ 29/612, 613, 618, 619, 29/614; 338/28, 30, 271, 302, 329, 331; 219/200, 201, 209; 73/263 AR

[56] References Cited
UNITED STATES PATENTS
2,216,375   10/1940   Minter .................................. 338/30
2,588,014   3/1952   Knudsen ........................... 29/612 X
3,499,217   3/1970   Mochizuki ........................... 29/612

Primary Examiner—Charles W. Lanham
Assistant Examiner—Victor A. DiPalma
Attorney, Agent, or Firm—Dugger, Johnson & Westman

[57] ABSTRACT

A resistance temperature sensor adapted to be produced in a semiautomated manner and which is extremely rugged in construction. The basic lead and support element is made in long lengths and then trimmed to stock lengths and the resistance wire is then mounted and enclosed. The exact overall length of the resistance sensor can be altered to a particular customer's requirements by trimming the lead and support assembly without substantially affecting the calibration of the resistance sensor. The sensor is constructed so that it is extremely rugged and insensitive to handling, and at the same time gives high accuracy.

5 Claims, 6 Drawing Figures

PATENTED MAR 26 1974 3,798,760

METHOD OF MAKING RESISTANCE WIRE TEMPERATURE SENSOR

This is a division of application Ser. No. 186,001, filed Oct. 4, 1971, now U.S. Pat. No. 3,761,857.

BACKGROUND OF THE INVENTION

1. Field of the Invention

The present invention relates to resistance wire temperature sensors.

2. Prior Art

Many different resistance sensors have been constructed in the prior art. Usually these involve a non-conductive support of some kind with the resistance wire mounted on this support. While the prior art resistance thermometers or temperature sensors generally have the advantage of providing a high output signal compared to a thermocouple, for example, and have a high degree of stability and repeatability over long periods of time, they have been adversely affected by the rough handling which is frequently experienced in the industrial world. Initial installation and maintenance of the monitored industrial equipment after the sensors are installed in many instances damages the sensors. When the sensors are exposed to a hostile environment over an extremely long period of time, conventionally manufactured sensors may also be damaged. Extremely rugged temperature sensors have been developed but these are generally designed for individual applications and the special design leads to high costs. These designs are not suited for general purpose industrial sensors.

SUMMARY OF THE INVENTION

The present invention relates to a sensing element employing a resistance wire which lends itself to high production with automated equipment. The element is made up to be extremely rugged, and the basic assembly of the element is made in desired stock lengths. The final sensor can be adjusted in length to suit an individual customer's requirements without substantially affecting the calibration of the sensor.

The basic leads of the sensor also form a core support for the helically wound resistance wire. The basic leads are trimmed in length to suit individual requirements. The leads are guite low in resistance in relation to the sensing element itself, and therefore the adjustment in length of the leads does not affect the calibration of the resistance sensing element.

The leads which support and are attached directly to the resistance element are extremely rugged, and avoid one troublesome area of the prior art wherein mishandling resulted in the lead wire being torn loose from the resistance wire at the point of connection. The leads in this instance serve as supports for the unit and are guite rugged.

The invention also relates to the method of making industrial sensors which are accurate and yet rugged and still low in cost.

DESCRIPTION OF THE PREFERRED EMBODIMENT

Figure 1:
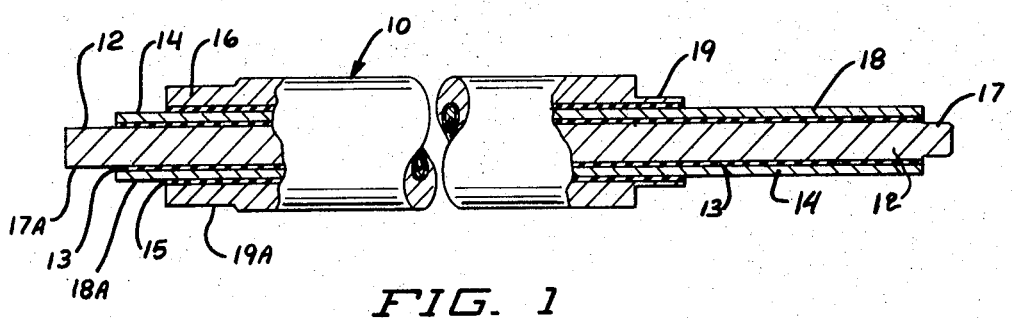
FIG. 1 is a part sectional view of an initial assembly for a resistance wire sensor made according to the present invention.

Referring specifically to FIG. 1, the temperature sensor comprises an initial lead and support assembly illustrated generally at 10 which comprises a mandrel on which the resistance wire element is mounted. This assembly is made up of a basic inner electrical conductor lead formed of a tube or rod 12 which is covered with an insulating sleeve 13. The insulating sleeve 13 can be of any desired material, but preferably is of a high temperature woven glass fiber flexible sleeving that can be easily slipped over the tube or rod 12, as shown, in order to insulate the metallic rod 12. An electrical conducting tube 14 is pulled over the rod 12 and sleeve 13 and tube 14 is swaged down onto the sleeve 13, and rod or tube 12 to form a solid assembly. Another sleeve of insulating material 15 (woven glass-fiber or the like) is drawn over the tube 14, and then an outer protective tube 16, is swaged over the prior assembly directly against the insulating sleeve 15. This basic lead-support assembly just described is made up into long lengths, and can be made in a semiautomated or automated process. The high temperature woven glass fiber insulating sleeve will compress slightly when the swaging operation is performed on the tubes 14 and 16.

The tube 16, when it is initially installed, is of uniform outside diameter, which is the largest diameter thereof shown in FIG. 1. Then, the support assembly is cut into preselected stock lengths usually on the order of 6 to 18 inches long. Each support assembly is then machined for further processing. The unit is turned down so that there is a surface 17 formed on the interior support rod or tube 12, a surface 18 which is the outer surface of the outer conducting tube 14, and which forms the mandrel support surface on which the resistance wire will be wound, preferably, and tube 16 is turned down to form an outer surface 19 and a shoulder. At the opposite end of the lead support assembly the surface 17A of rod or tube 12 is exposed which is the same diameter as the rod 12. The surface 18A of tube 14 is exposed, and a surface 19A is formed on the tube 16 and forms a small shoulder around the tube.

Figure 2:
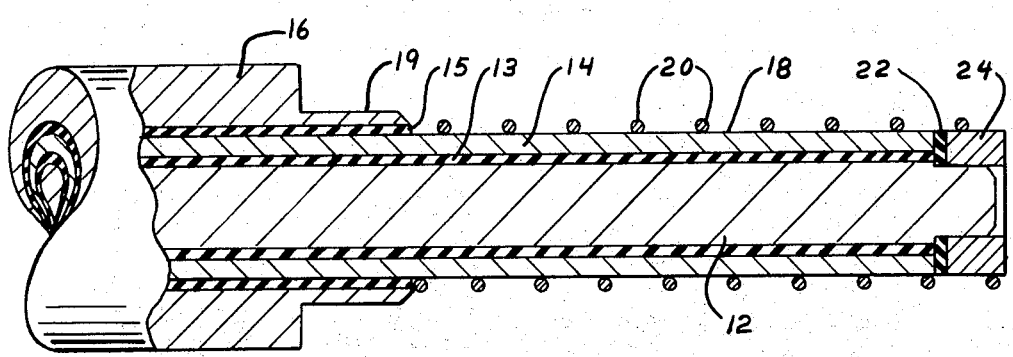
FIG. 2 is a fragmentary enlarged sectional view showing a further step of forming the resistance sensor of the present invention.

Now, referring to FIG. 2, there is a more detailed showing of the resistance wire support end of the assembly. In the next step of making the sensor, a disc 22 of insulating material which has a central opening is slipped over the surface 17 and positioned against the shoulder formed by the tube or rod 12, the end of the insulating sleeve 13 and the end of tube 14. A ring 24 of conducting material has a central opening and is pressed onto the end of rod 12 around the surface 17, and is pushed against the disc 22 of insulating material. The press fit between the surface defining the opening in ring 24 and the surface 17 holds the disc 22 in position, and makes a good electrical connection between the ring 24 and the inner lead-support rod 12 while disc 22 insulates the ring from tube 14. A final machining cut may be made along surface 18 so that the cut includes the outer surface of the ring 24 and insulating washer 22. Then, the resistance wire or sensing element is wound into place. The resistance wire is illustrated at 20 in FIG. 2. A very thin coating of insulating material must be placed over the surface 18 prior to winding on wire 20, or else the wire 20 itself must have a preplaced insulating coating thereon so that there is electrical insulation between the resistance wire 20 and the surface 18 (including the surface of ring 24). Of course, the surface 18 is on the conducting tube 14, as previously explained. Preferably, an insulated wire is utilized because high purity resistance wires are available with high temperature insulation on the wire itself.

Alternatively disc 22 and ring 24 may be dispensed with by machining that end of the assembly to a tapered surface, attaching one end of the resistance wire 20 to the then tapered portion of surface 17, then commencing the winding across the insulation 13, thence around the tube surface 18. Sharp edges must be avoided upon the mandrel, however and the uniform diameter provided by the embodiment illustrated is usually preferred.

Figure 3:
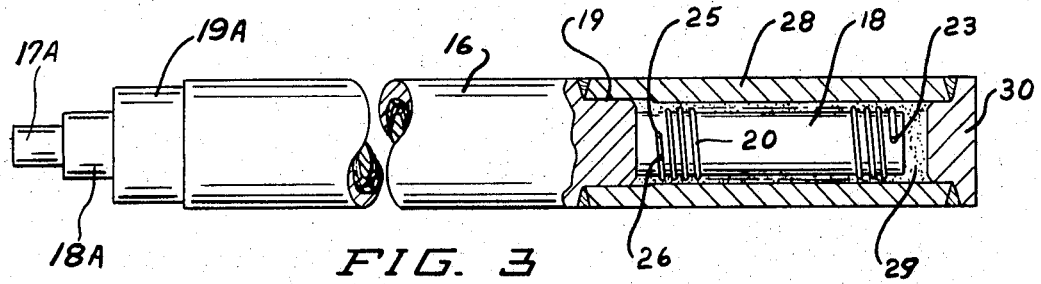
FIG. 3 is a part sectional view of the sensor showing a still further step in the forming.
Figure 4:
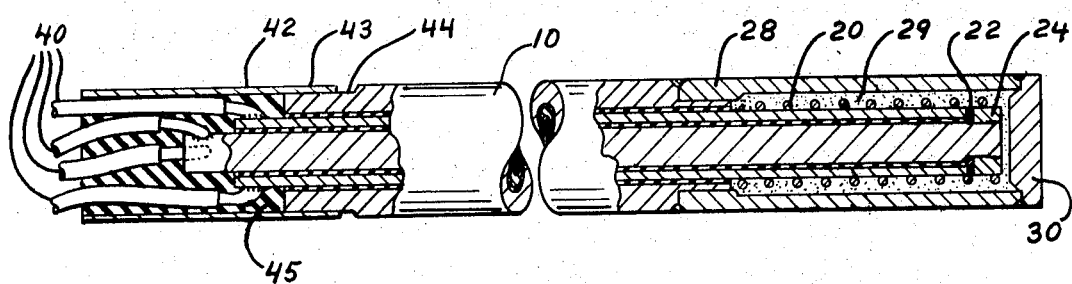
FIG. 4 is a view of a finished sensor made according to the present invention with parts in section and parts broken away.

Referring specifically to FIGS. 3 and 4, the wire 20 is started at point 23 by welding or otherwise mechanically and electrically attaching the end of the wire 20 to the outer surface of the ring 24. The insulating coating on the wire or surface 18 is punched through so that a good electrical connection is made. Then the wire 20 is helically wound along and around the surface 18 to an end point 25 where it is spot welded (electrically and mechanically attached) to surface 18. The wire 20 is wound tightly onto the surface 18 so that it will remain stationary on the surface 18. Through the connection 23 to the ring 24 and the press fit connection between the inner surface of ring 24 and surface 17 of rod 12, one end of the resistance wire is electrically and physically connected to the inner lead-support rod or tube 12. The other end of the resistance wire is electrically connected by junction 25 to the outer surface of the lead-support tube 14, which is also electrically conductive. The resistance wire 20 and the entire assembly is preferably annealed at this stage of construction. Final trimming of the resistance value of wire 20 can be done after annealing by spot welding the resistance wire to be tube 14 at a different position along its length, for example at position 26, to adjust the resistance of the wire to come within the desired limits. This spot weld 26 will effectively reduce the overall resistance by shortening the operative length of the wire 20.

The mandrel support for the resistance wire may also be formed by the core member 12 alone as long as the wire is insulated therefrom. In this instance the tube 14 would be machined away to expose either the insulation 13 or the surface of rod 12 and the wire 20 wound on this exposed surface with care being taken to insulate the wire from the rod 12 and tube 14 except at the ends thereof. A separate insulation tube or sleeve also could be used over the rod 12 if desired.

The ends of the wire 20 are electrically attached to the rod 12 at one end and to tube 14 at the other end as explained above. A short section of surface 18 could be left extending out from surface 19 for attachment of the wire 20, and also for trimming. A conical taper also could be used from surface 18 to the surface of rod 12 or insulation 13 when they form mandrel surfaces.

After the assembly has been annealed, and trimmed or adjusted to its desired value, a tube 28 which has a slight interference fit with the surface 19 is pressed over this surface. The end of the tube 28 abuts on the shoulder formed by surface 19 on the tube 16 and the tube 28 is thus kept in proper position, concentric with the axis of the rod 12 so that there is a cavity 29 formed between the inner surface of the tube 28 and the mandrel surface which is shown as surface 18, in which the resistance wire 20 is now positioned. The inner surface of the tube 28 is also spaced from the resistance wire 20 a desired amount. The cavity 29 is then filled with a suitable insulating material such as a metal oxide in powder form. For example, aluminum oxide which is poured into the cavity 29 while the sensing element is vibrated may be used. The cavity 29 is then filled with packet insulating material and the insulating material holds the wire 20 in place.

After filling the cavity 29 an end cap 30 is placed onto the end of the tube 28. The cap 30 includes a pilot member forming a shoulder that is pressed into the end of the tube 28. The ends of the tube 28 are then welded as shown to join one end of the tube 28 to the tube 16 and the other end to the cap 30. These welds are continuous to hermetically seal the interior cavity 29.

The assembly now is as shown in FIG. 3. These assemblies may then be retained in stock of the manufacturer, and if a different length is needed, all that has to be done is that the end of the assembly extending toward the left can be trimmed off, and new surfaces 17A, 18A and 19A formed as desired.

Assuming that the element assembly length is correct, and an order is taken for a resistance sensor, the lead wires 40 are connected in a suitable manner to the rod 12 and to the tube 14 which form the leads from the resistance wire 20. The leads 40 are insulated conductors and are four in number with two leads 40 attached to each of the lead support members 12 and 14 thus providing a conventional four lead wire resistance temperature sensor. The wires 40 may be spot welded in place as shown, and after the wires 40 are put into place, a tube 42 is slipped over the lead wires and over the surface 19A, and is then spot welded as at 43. A gap or shallow groove 44 may be left, as shown in FIG. 4, in order to accommodate a snap ring or O ring for holding the entire temperature sensor assembly in some further assembly. The cavity formed by the tube 42 surrounding the leads 40 is then filled with a flexible insulating material such as the silicone rubber indicated at 45. The unit then may be connected into a conventional bridge circuit.

Figure 5:
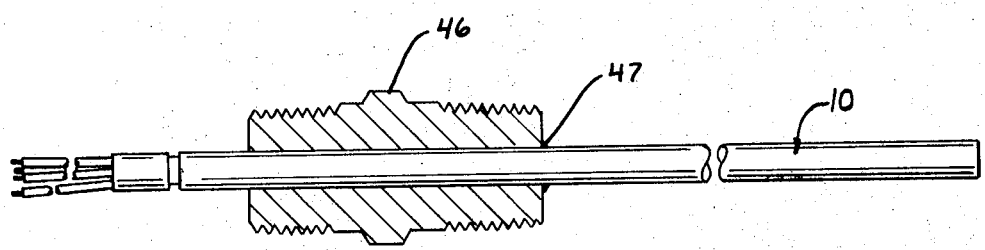
FIG. 5 is a side view of a sensor showing a connector for attaching the sensor of the present invention to industrial equipment.

FIG. 5 shows a very simple mounting for the sensor wherein a conventional coupling member 46 is slipped over the outer tube 16 and is welded into place as indicated at 47. This will be to the customer's specification for the length of the sensor from its outer tip to the base of the coupling. Then the sensing unit can be threaded into the desired installation.

Figure 6:
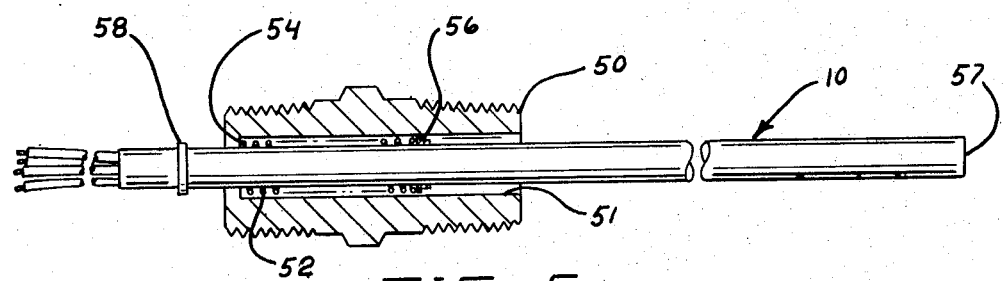
FIG. 6 is a view of a further modified attachment device used with the sensor of the present invention.

FIG. 6 also shows a means for mounting the sensor 10 of the present invention in a mounting location. In some instances it is desirable to spring load the sensors so that the tip of the sensing element actually is held with a spring force against a support or wall structure. In FIG. 6, the coupling member 50 has a bore 51 that is of larger diameter than the outer diameter of the tube 16 of the temperature sensor assembly 10. A shoulder 54 is formed on the interior of coupling 50 and the bore or opening defined by this shoulder forms a close fit with the sensing assembly 10. A coil spring 52 is placed inside the bore 51 and abuts against the shoulder 54. The spring also reacts on a spring retainer ring 56 welded to the tube 16. The spring urges the coupling toward a snap ring 58 which can be placed into the groove 44, previously shown, to keep the coupling from sliding off the unit in direction of the leads. The coupling is placed so that the outer end surface 57 of the sensing assembly will abut against a stop or a surface of the mounting structure for the sensor when the coupling member 50 is inserted into place and so that the spring 52 is compressed to urge the end 57 against the opposite wall of the structure in which the sensor is mounted. An 0 ring may be used in conjunction with shoulder 54 to provide a slidable seal, if desired.

The assembly can be relatively small in size, usually one-eighth to one-quarter inch in diameter, and the resistance element can be of platinum, nickel or other metals used for wire temperature sensing elements. A very thin coating of insulation on the element wire itself is desirable as previously explained, in order to eliminate the necessity for insulating the outer surface of the tube 14 before the wire element is mounted into place. The primary lead supports 12 and 14, which are connected electrically to the opposite ends of the resistance wire may be made of stainless steel and should be selected to be closely matched in thermoelectric characteristics so that unwanted thermal EMF's are not set up in the presence of thermal gradients.

If uninsulated resistance wire is used, an insulating coating over the surface 18 can be plasma sprayed in a coarse layer. Alternatively, one could provide an oxide growth forming an insulating layer on the outer surface 18 of the tube 14.

The material used for filling cavity 29, while being electrical insulation should have high thermal conductivity to insure that heat at the outer surface of the sensor is conducted to the resistance wire.

The surface 18 on tube 14 is the preferred wire support mandrel surface because of ease of trimming the resistance wire and because it forms a larger diameter support. If the rod or core member 12 is used as the mandrel surface the ring 24 and disc 22 can be omitted. The wire 20 has to be insulated from the rod 12 except where the end of the wire connects to the rod, and also the rod 12 and the wire 20 must be insulated from tube 14, except the wire 20 is electrically connected to the tube 14 at one end.

When the rod 12, which is one of the leads, forms the mandrel support and tube 14 is cut away, the advantages of adjusting the overall length of the sensor by cutting the opposite ends of the leads without affecting the calibration or resistance value is still achieved.

What is claimed is:

1. The method of making a resistance wire sensor comprising the steps of providing a conductive core member, insulating the outer surface of said core member, placing a conductive tube over said insulation and said core member to form as assembly, cutting said assembly into desired lengths for an individual sensor element, exposing portions of said assembly adjacent one end thereof to form a mandrel support, mounting a resistance wire onto the mandrel support assembly, said resistance wire being insulated from said support along its major length, connecting one end portion of said wire to said tube adjacent one end thereof, and connecting an opposite end portion of said resistance wire to said core member whereby said tube and core member comprise primary leads for said resistance wire.

2. The method of claim 1 including the further steps of applying a second insulating layer over said conductive tube, placing an outer tubular housing over said second insulating layer to form an assembly, cutting the assembly into a desired mandrel length, and removing portions of the assembly to expose at least a portion of said core and a portion of the outer surface of said conductive tube prior to winding the resistance wire thereon.

3. The method of claim 2 including the further step of applying lead wire means to said core and conductive tube, respectively, at ends thereof opposite from the resistance wire.

4. The method as specified in claim 1 comprising the steps of placing a tubular cover housing over said resistance wire after the wire is placed on said mandrel support to form a cavity between the conductive tube and cover housing, and filling the cavity with an electrically insulating thermally conductive material.

5. The method as specified in claim 1 comprising the steps of exposing an end portion of said conductive core member which extends longitudinally beyond said conductive tube, attaching a ring member to said core and insulating the ring member from said conductive tube, prior to placing said wire on said mandrel support and connecting the second end of said wire to said ring member.

* * * * *

PO-1050
(5/69)

UNITED STATES PATENT OFFICE
CERTIFICATE OF CORRECTION

Patent No. 3,798,760      Dated March 26, 1974

Inventor(s) John T. M. Carlson et al.

It is certified that error appears in the above-identified patent and that said Letters Patent are hereby corrected as shown below:

Column 1, line 46, "guite" should be--quite--; Column 1, line 55, "guite" should be--quite--. Column 3, line 48, "be" should be--the--. Column 4, line 19, "packet" should be --packed--. Column 6, line 12, (Claim 1, line 5) "as" should be--an--.

Signed and sealed this 13th day of August 1974.

(SEAL)
Attest:

McCOY M. GIBSON, JR.      C. MARSHALL DANN
Attesting Officer      Commissioner of Patents